(12) United States Patent
Figgins et al.

(10) Patent No.: US 9,769,982 B2
(45) Date of Patent: Sep. 26, 2017

(54) METHOD AND APPARATUS FOR AUTOMATICALLY CONTROLLING A CUT HEIGHT OF AN AGRICULTURAL HARVESTER

(71) Applicant: CNH Industrial America LLC, New Holland, PA (US)

(72) Inventors: Ryan Figgins, New Holland, PA (US); Roger Huggard, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 53 days.

(21) Appl. No.: 14/848,546

(22) Filed: Sep. 9, 2015

(65) Prior Publication Data

US 2017/0064904 A1   Mar. 9, 2017

(51) Int. Cl.
*A01D 41/14*   (2006.01)
*A01D 34/00*   (2006.01)

(52) U.S. Cl.
CPC ......... *A01D 34/006* (2013.01); *A01D 41/141* (2013.01)

(58) Field of Classification Search
CPC .... A01D 41/141; A01D 41/14; A01D 75/185; A01D 34/006
See application file for complete search history.

(56) References Cited

U.S. PATENT DOCUMENTS

| | | | | |
|---|---|---|---|---|
| 3,722,193 A | * | 3/1973 | Strubbe | A01D 41/141 56/208 |
| 3,886,718 A | * | 6/1975 | Talbot | A01D 41/141 56/10.2 E |
| 4,944,141 A | * | 7/1990 | Orlando | A01D 41/145 56/10.2 E |
| 5,359,836 A | | 11/1994 | Zeuner et al. | |
| 5,469,694 A | | 11/1995 | Panousheck et al. | |
| 8,333,057 B2 | * | 12/2012 | Schroeder | A01D 41/141 56/10.2 E |

(Continued)

FOREIGN PATENT DOCUMENTS

EP   2679086 A1   1/2014

OTHER PUBLICATIONS

European Search Report; 16187963.0-1656; Feb. 7, 2017.

*Primary Examiner* — Robert Pezzuto
*Assistant Examiner* — Adam Behrens
(74) *Attorney, Agent, or Firm* — Patrick M. Sheldrake (57) ABSTRACT

A method for automatically controlling a cut height of a header of an agricultural harvester. The method includes positioning the header to a predetermined cut height set point, measuring a ground speed of the agricultural harvester, measuring a height of the header relative to a ground surface at a plurality of positions along a length of the header. The method further includes lowering the header towards a first adjusted cut height threshold if a measured height of one of the plurality of positions is above the predetermined cut height set point and the measured ground speed is less than a first predetermined ground speed. The subject application allows the automatic header height control software on an agricultural harvester to automatically deviate from the predetermined cut height set point. This allows better control of the header at higher speeds and allows more crop to be gathered without manual intervention.

21 Claims, 6 Drawing Sheets

(56) References Cited

U.S. PATENT DOCUMENTS

| | | | |
|---|---|---|---|
| 2003/0000193 A1* | 1/2003 | Beck | A01D 41/141 |
| | | | 56/10.2 E |
| 2003/0019196 A1* | 1/2003 | Coers | A01D 41/127 |
| | | | 56/10.2 G |
| 2003/0140609 A1* | 7/2003 | Beaujot | A01D 41/141 |
| | | | 56/10.2 E |
| 2006/0248868 A1* | 11/2006 | Otto | A01D 41/145 |
| | | | 56/10.2 E |
| 2007/0214760 A1* | 9/2007 | Bomleny | A01D 41/145 |
| | | | 56/10.2 E |
| 2008/0177449 A1* | 7/2008 | Pickett | A01D 41/141 |
| | | | 701/50 |
| 2010/0287898 A1* | 11/2010 | Ringwald | A01D 46/08 |
| | | | 56/10.2 E |
| 2010/0287900 A1* | 11/2010 | Ringwald | A01D 46/08 |
| | | | 56/17.1 |
| 2011/0099962 A1* | 5/2011 | Coers | A01D 41/141 |
| | | | 56/10.4 |
| 2012/0174549 A1* | 7/2012 | Schroeder | A01D 41/141 |
| | | | 56/10.2 E |
| 2014/0041351 A1* | 2/2014 | Bollin | A01D 41/141 |
| | | | 56/10.2 E |
| 2014/0295922 A1* | 10/2014 | Buermann | A01D 41/141 |
| | | | 460/1 |
| 2015/0033692 A1 | 2/2015 | Schroeder et al. | |
| 2016/0007531 A1* | 1/2016 | Schlipf | A01D 41/141 |
| | | | 56/10.2 E |
| 2016/0280221 A1* | 9/2016 | Jung | A01B 76/00 |

* cited by examiner

METHOD AND APPARATUS FOR AUTOMATICALLY CONTROLLING A CUT HEIGHT OF AN AGRICULTURAL HARVESTER

BACKGROUND

The subject application relates generally to agricultural harvesters. In particular, the subject application relates to a header for automatically controlling a cut height and method thereof.

During a harvesting operation, a header at the front of the harvester cuts ripened crops from the field. The header is attached to the front of the harvester and includes mechanisms, for example, for cutting crops, gathering crops and depositing crops into a swath in the case of a self-propelled windrower or delivering crops to the harvester's feederhouse. The objective of the agricultural harvester is to gather as much crop material as possible when traveling across the field. This can become increasingly difficult as the ground contour often includes crowns and swales resulting in the header missing crops during harvesting operations. As a result, crop yields are lower and wasted crop material is left behind on the field.

Generally, the operation of agricultural harvesters requires substantial operational involvement and control by the operator. For example, operators have to monitor the direction of the agricultural harvester, adjust the speed of the agricultural harvester, and monitor the operation of the harvester's systems. Such operational involvement by the operator distracts from the operator's focus on maximizing the harvester's crop yield.

Many agricultural harvesters today utilize automatic header height control systems to maintain a desired cut height based on the type of crop being harvested. However, conventional automatic header height control systems do not allow the header to drop below the desired cut height set point regardless of the contour of the ground. This causes the header to constantly adjust and miss out on crop material due to changes in landscape i.e., travel over uneven terrain, thereby resulting in lower crop yields without significant manual intervention by the operator. As a result, in the case of e.g., a crowned ground contour, the header would miss crops on the ends of the header because the middle ground sensors would be set or adjusted to the desired cut height set point.

Therefore, there is still a need for a method for automatically controlling a cut height that addresses the foregoing issues of conventional header control systems.

BRIEF SUMMARY

In accordance with an aspect, the subject application provides a method for automatically controlling a cut height of a header of an agricultural harvester that includes positioning the header to a predetermined cut height set point, measuring a ground speed of the agricultural harvester, measuring a height of the header relative to a ground surface at a plurality of positions along a length of the header, and repositioning the header towards a first adjusted cut height threshold if a measured height of one of the plurality of positions is above the predetermined cut height set point and the measured ground speed is less than a first predetermined ground speed.

In accordance with another aspect, the subject application provides an agricultural harvester that includes a header. The header includes a plurality of ground sensors and a computer operatively connected to the header and the plurality of ground sensors. The plurality of ground sensors are spaced along a width of the header. Each ground sensor is configured to measure a distance from the header to a ground surface. The computer is configured to cause the header to adjust a position of the header from a predetermined cut height set point towards a first adjusted cut height threshold if a measured distance of one of the plurality of ground sensors is above the predetermined cut height set point and a measured ground speed of travel of the agricultural harvester is less than a first predetermined ground speed.

In accordance with yet another aspect, the subject application provides a method for automatically controlling a cut height of a header of a windrower that includes positioning the header to a predetermined cut height set point, measuring a ground speed of the windrower, and measuring a height of the header relative to a ground surface at a plurality of positions along a length of the header. The method further includes repositioning the header towards a first adjusted cut height threshold if a measured height of one of the plurality of positions is above the predetermined cut height set point and the measured ground speed is less than about 3 miles per hour, repositioning the header towards a second adjusted cut height threshold if a measured height of one of the plurality of positions is above the predetermined cut height set point and the measured ground speed is 3 miles per hour or greater and less than 6 miles per hour, and repositioning the header towards a third adjusted cut height threshold if a measured height of one of the plurality of positions is above the predetermined cut height set point and the measured ground speed is about 6 miles per hour or greater.

In accordance with yet another aspect, the subject application provides a method for automatically controlling a cut height of a header of a windrower that includes positioning the header to a predetermined cut height set point and measuring a height of the header relative to a ground surface at a plurality of positions along a length of the header. The method further includes repositioning the header below the predetermined cut height set point if a measured height of one of the plurality of positions is above the predetermined cut height set point. Furthermore, the method includes measuring a ground speed of the windrower.

Additionally, the step of repositioning the header below the predetermined cut height set point includes, repositioning the header towards a first adjusted cut height threshold if a measured ground speed is less than about 3 miles per hour, repositioning the header towards a second adjusted cut height threshold if a measured ground speed is 3 miles per hour or greater and less than 6 miles per hour, and repositioning the header towards a third adjusted cut height threshold if a measured ground speed is about 6 miles per hour or greater.

The subject application provides an improved method allowing a header height control system of an agricultural harvester to efficiently deviate automatically from a set point. This allows better control of the header at higher speeds and allows the header to gather more crop without manual intervention. Conventional automatic header height control systems do not allow sensors to drop below the predetermined cut height set point. As such, in the case of a crown in the field, the header would try to maintain the set point only at the middle of the header and ignore the outer two sensors that have maxed out their travel. As a result, operation of an agricultural harvester with the conventional system has the potential to miss crops e.g., on the ends of the header, without an operator intervention. The advantage of this particular design is that it allows the automatic header height control software to use all four sensors to lower the header below a programmed set point in an effort to gather as much crop as possible. The subject application differs from existing conventional designs because conventional designs do not allow any sensor to drop below the predetermined cut height set point. This particular method for automatically controlling a cut height of a header addresses the need to maximize efficiency of crop harvesting operations while requiring minimal manual involvement by the operator.

In sum, the subject application provides a method for automatically controlling a cut height of a header and which allows for the automatic header height control system to deviate automatically from the set point. The resultant advantages of such a method include better control of the agricultural harvester at higher speeds while allowing the header to gather more crop without substantial intervention from the operator.

Conventional automatic header height control software tries to maintain a set point and is programmed to not let the header drop below this set point. As a result, the header constantly searches and over-corrects. The header constantly searching and over-correcting becomes amplified as ground speed increases. The change in the subject application is to incorporate a tolerance band that allows the software to deviate from the set point.

In conventional harvester systems, the operator selects a set point for a desired cut height and the automatic header height control systems do not allow sensors to drop below the predetermined cut height set point. Moreover, conventional self-propelled windrowers do not have automatic header height control systems. In contrast, the subject application provides for automatic header height control software on harvester systems including self-propelled windrowers that allow headers to deviate below the programmed set point. Specifically, automatic header height control software in accordance with the subject application is utilized to lower the header below the programmed set point in an effort to gather as much crop as possible.

Adjustments to the cut height are relative to a ground speed of the harvester to provide uniformity of the cut height while traveling across a varying ground contour. The amount of allowable deviation from the set point is dependent on ground speed to minimize the potential for damage to the header that would be caused by a sudden change in terrain that the system cannot respond to quickly enough to avoid hard ground contact. If the header is operating at a slow ground speed, (e.g., below 3 miles per hour), the software is programmed to drop the header to within 10% of an operating range of any two potentiometer sensors in an effort to attempt to satisfy the set point requirement of the remaining two sensors. For example, in the case of a crown in the field, the two sensors located in the middle would lower to within 10% of an operating range if the outer sensors were still reading above the set point. In the case of a terrace or swale, the header would tilt or lower to within 10% of an operating range of the other two sensors if the middle sensors were reading above the set point. If the header is operating at an intermediate ground speed, (e.g., 3.1-6.0 miles per hour), the software is programmed to drop the header to within 15% of an operating range of any two sensors in an effort to attempt to satisfy the set point requirement of the remaining two sensors. If the header is operating at a fast ground speed, (e.g., greater than 6 miles per hour), the software is programmed to drop the header to within 20% of an operating range of any two sensors in an effort to attempt to satisfy the set point requirement of the remaining two sensors.

The programmed deviations can vary depending on system needs. Also, the speed ranges could vary. There could be more than three sets of speed ranges corresponding to multiple sets of deviation percentages. Three stages, slow, medium, and fast were used as illustrations. Alternatively, the deviations could be from the desired set point rather than from an operating range of the sensor.

BRIEF DESCRIPTION OF THE SEVERAL VIEWS OF THE DRAWINGS

The foregoing summary, as well as the following detailed description of the several aspects of the subject application, will be better understood when read in conjunction with the appended drawings. For the purpose of illustrating the subject application, there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Automatic header height control systems on agricultural harvesters maintain a desired cut height and operate in a manner that minimizes or eliminates potential damage to the header or any of its components. As will be discussed in more detail below, the subject application includes a method for automatically adjusting a cut height of a header of an agricultural harvester in response to a measured height of the header relative to the ground surface and a measured ground speed of the agricultural harvester.

The term "grain" and "crop material" are used throughout the specification for convenience and it should be understood that these terms are not intended to be limiting. Thus, "grain" refers to that part of a crop which is harvested and separated from discardable portions of crop material. "About", as used herein is meant to correspond to a +/−1%, +/−5%, +/−10%, +/−20% or +/−30% deviation of a stated value as such variations are appropriate.

Figure 1:
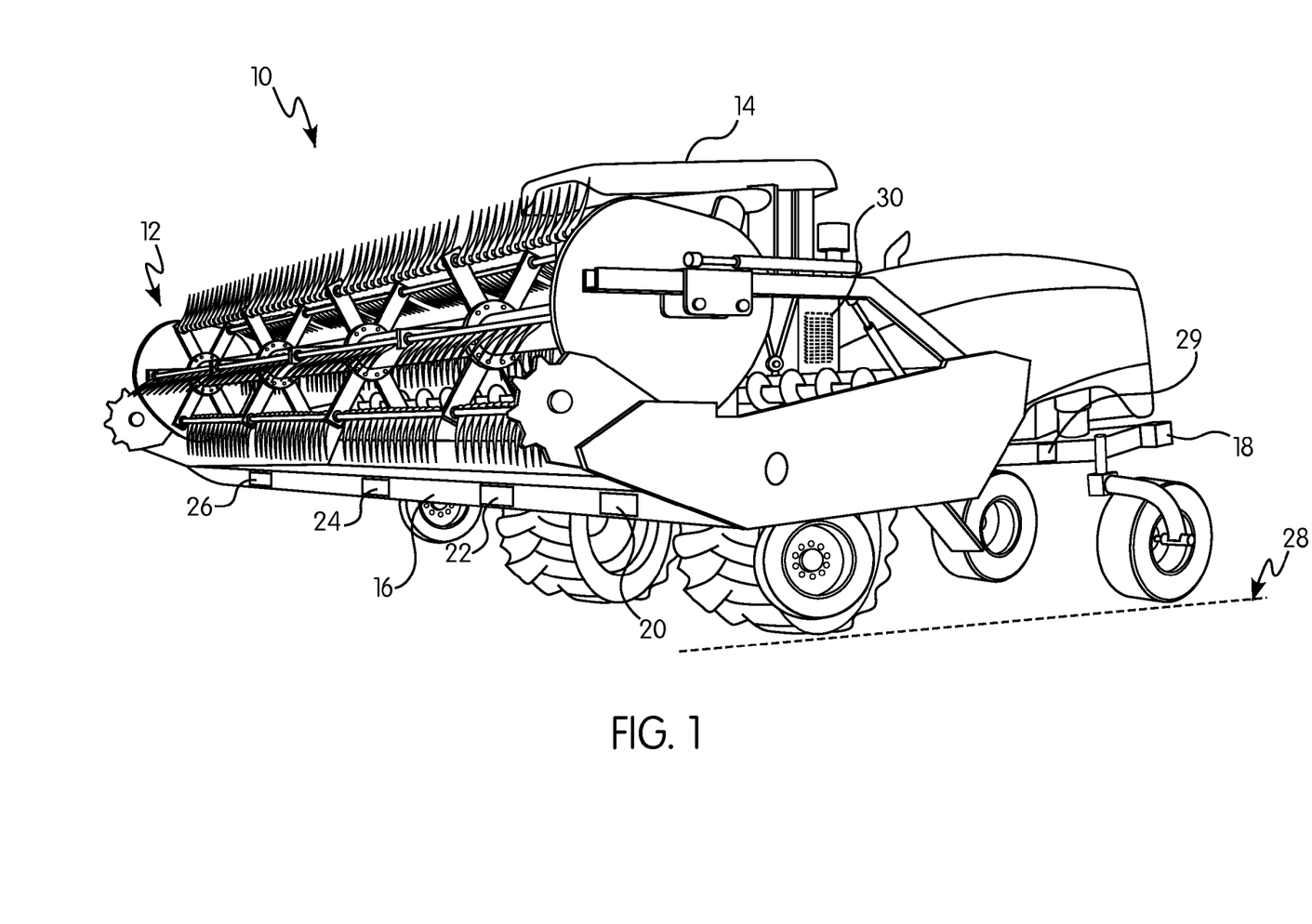
FIG. 1 is a perspective view of an agricultural harvester in accordance with an aspect of the subject application.

Referring to FIG. 1, there is shown an agricultural harvester 10, which is a well-known agricultural vehicle used in cutting and harvesting operations. The agricultural harvester 10 includes a header 12, which is configured to cut or sever crops from the field. For purposes of illustration only and not by way of limitation, the header will be described herein as a draper header for a self-propelled windrower, but can alternatively be any other header such as a corn header and the like. The agricultural harvester 10 further includes, among other components, an operator cab 14, a cutter bar 16, and a support frame 18. The support frame 18 serves generally as a chassis for the agricultural harvester 10 supporting the above-mentioned components. Such components of the agricultural harvester 10 are known and therefore a detailed description of their structure, function and operation is not necessary for a complete understanding of the subject application.

The header 12 is attached to the front or anterior end of the agricultural harvester 10. The header 12 further includes mechanisms for cutting crops, gathering crops and delivering crops to the agricultural harvester. The header 12 is positioned relative to a ground surface 28 upon which the agricultural harvester travels. To efficiently harvest grain or other crops from a field, the placement of the header 12 is adjusted relative to the type of crop being harvested to a predetermined cut height set point specific to that particular type of crop.

Figure 2:
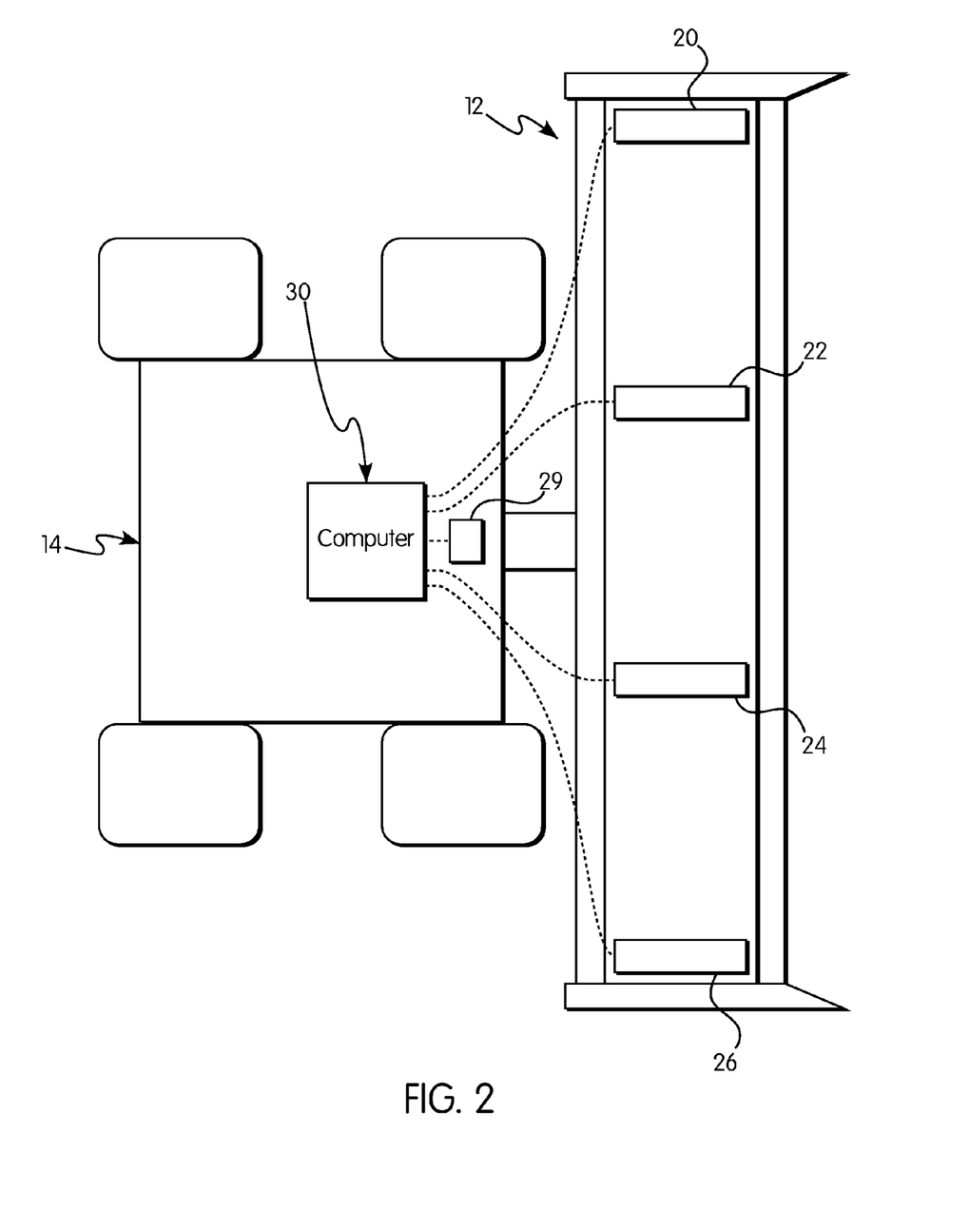
FIG. 2 is a schematic top plan view of an agricultural harvester in accordance with an aspect of the subject application and a header with various components omitted for purposes of illustration.

Referring to FIGS. 1 and 2, the header 12 includes a plurality of ground sensors 20, 22, 24 and 26 (shown schematically) about a bottom end of the header. In an aspect, the header 12 is configured to have four ground sensors spaced along a width of the header. Ground sensors 20, 22, 24, 26 are configured to measure a distance from the header to the ground surface 28. The ground sensors can be ultrasound sensors, radar sensors, optical sensors or potentiometers. Although the header 12 as shown is configured to have four ground sensors, additional ground sensors may be placed at additional locations along the width of the header e.g., adjacent the cutter bar. The ground distance measurement is not limited to the arrangement shown and may include any known arrangement for measuring or determining the height of the header from the ground.

For example, potentiometers are configured to produce a voltage representative of the positional relationship between the header and the ground. The arrangement of potentiometers produce a voltage representative of the distance between the header and the ground. Thus, by comparing the voltage based representations of the distance between the potentiometers on the header 12 and the ground surface 28, the height of the header from the ground can be determined and monitored.

As mentioned above, the ground sensors are attached about a bottom end of the header. As best shown in FIG. 2, which illustrates a header with its major components omitted to show the positioning of the sensors, there are a pair of ground sensors 20, 26 each positioned at the leftmost and rightmost end of the header i.e., the lateral ends of the header. Additionally, a pair of middle sensors 22, 24 are equally spaced between ground sensors 20, 26 located on the lateral ends of the header. Specifically, ground sensor 22 is positioned about a middle left end or about ⅓ of the width of the header from the left end of the header, and ground sensor 26 is positioned about a middle right end or about ⅓ of the width of the header from the right end of the header.

The agricultural harvester 10 also includes a ground speed sensor 29. The ground speed sensor can be any sensor or device capable of determining ground speed of the agricultural harvester 10. For example, the ground speed sensor can be a speedometer, a global positioning system (GPS) device, a shaft or motor speed indicator or any other device suitable for measuring a parameter suitable for determining or estimating ground speed. Alternatively, the ground speed can be directly measured, calculated or indirectly measured or determined by the operator. In an aspect, the ground spend sensor 29 can be attached to the header or agricultural harvester and operatively connected to a computer system of the harvester, as further discussed below.

The agricultural harvester 10 further includes a computer 30 (FIG. 2) operatively connected to the header 12, the plurality of ground sensors 20, 22, 24 and 26 and the ground speed sensor 29. The computer 30 includes or is operatively associated with a non-transitory computer readable medium having stored thereon computer instructions that, when executed by a processor, cause operational movement of the header 12. The computer instructions when executed cause the header to adjust the cut height of the header based upon measured distances of the plurality of ground sensors and a measured ground speed of travel of the agricultural harvester 10.

As discussed above, the agricultural harvester 10 includes the computer 30 which can include a microprocessor based circuit. The computer 30 may include one or more processors, computer readable memories locally or remotely e.g., cloud based, input/output modules, and other common components. An example of a control system applicable to the subject application is disclosed in U.S. Pat. No. 5,469,694, entitled "Agricultural Vehicle Including A System for Automatically Moving An Implement To A Predetermined Operating Position," the entire disclosure which is hereby incorporated by reference in its entirety for all purposes.

Figure 3:
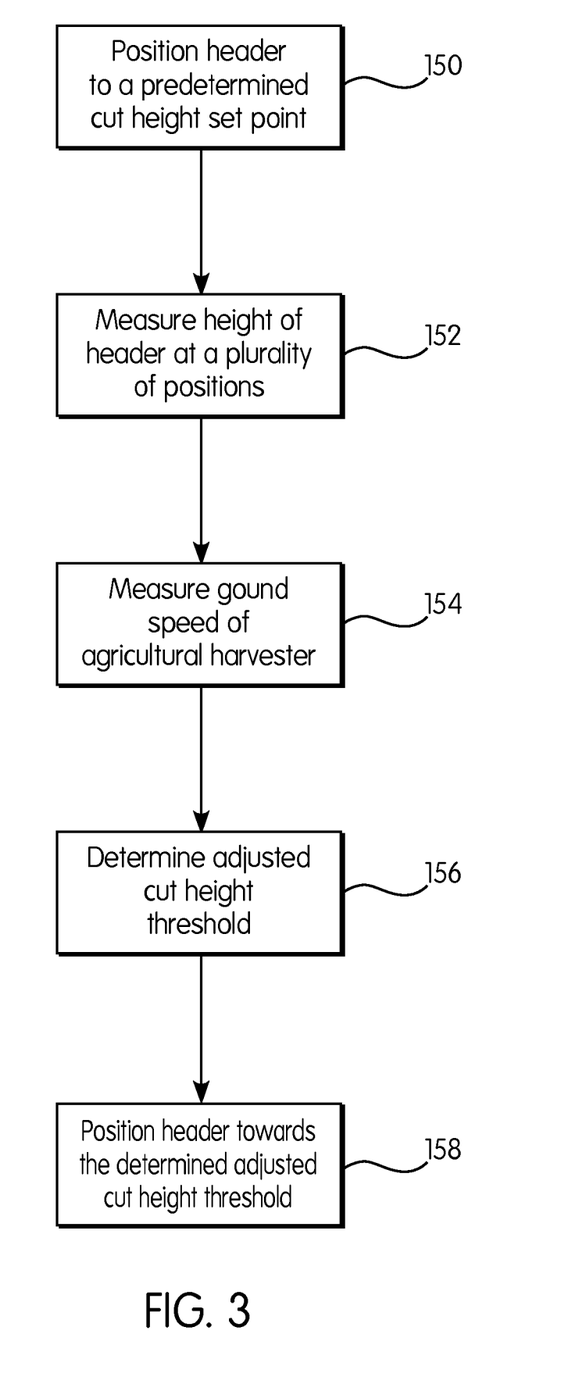
FIG. 3 is a flow diagram illustrating a method of automatically controlling a cut height of a header in accordance with an aspect of the subject application.

FIG. 3 illustrates an exemplary flow diagram illustrating an aspect of a method for automatically adjusting the cut height of the header while operating the agricultural harvester. The computer contains instructions for positioning the header at a predetermined cut height set point (step 150). Prior to placing the agricultural harvester into operation, the operator inputs into the computer the predetermined cut height set point. Alternatively, instead of using the pre-defined default settings for the first adjusted cut height threshold, second adjusted cut height threshold, third adjusted cut height threshold, first predetermined ground speed and second predetermined ground speed, the operator may modify the default operating parameters for such settings to better suit his or her needs.

Figure 6:
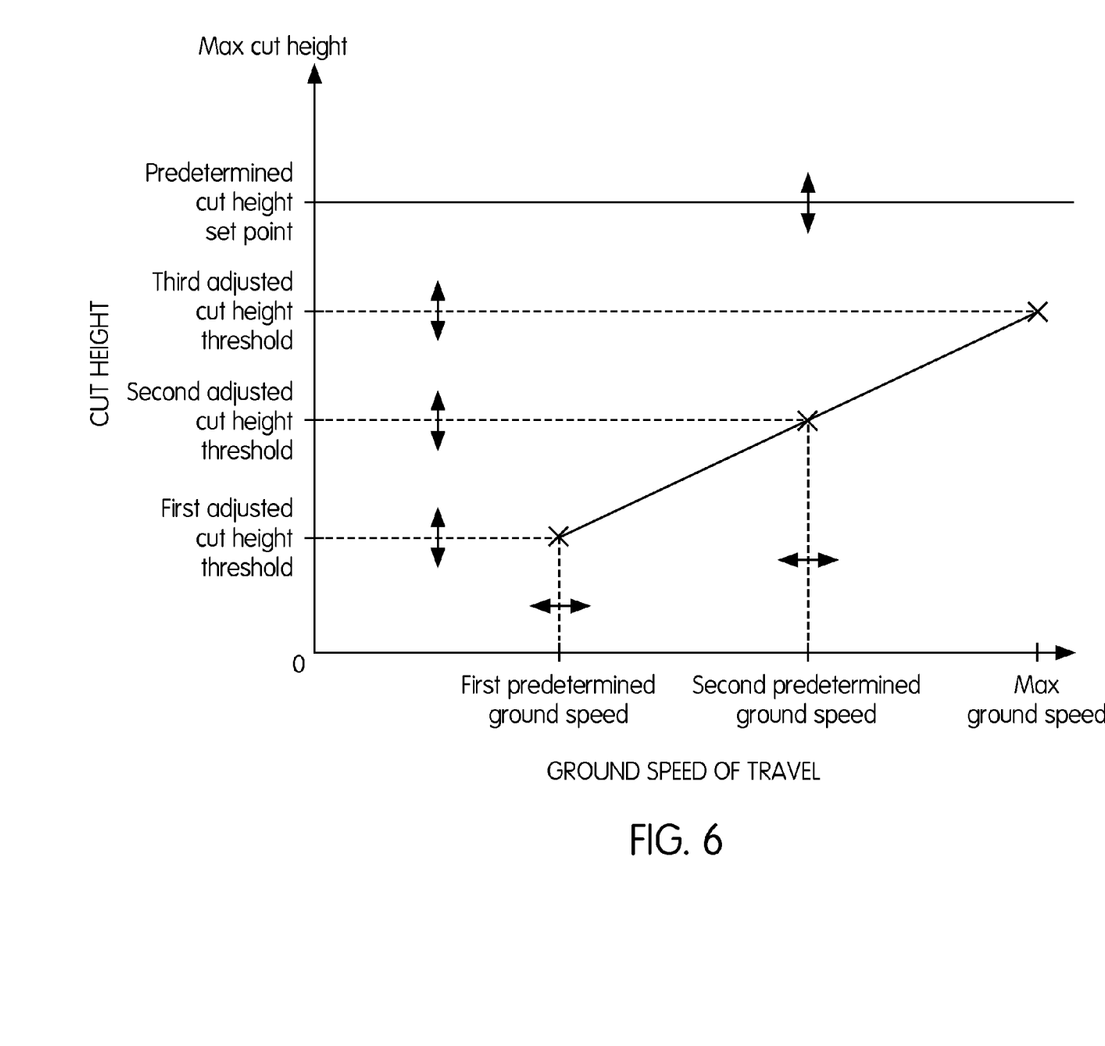
FIG. 6 is a graphical representation of operating parameters for the automatic header height control system of an agricultural harvester in accordance with an aspect of the subject application.

FIG. 6 illustrates a graphical representation of the operating parameters for the automatic header height control system and the relationship between adjusted cut height thresholds and predetermined ground speeds. Further, while the subject application utilizes ground speed as a parameter for determining cut height thresholds, other parameters may be utilized for determining proper adjusted cut height thresholds. For example, adjusted cut height thresholds can be based on values set by the operator, immediate past ground contour measurements, a GPS elevation map of a particular field or any other or combination of user defined inputs.

As discussed above, and in greater detail below, the predetermined cut height set point is inputted by the operator based upon the type of crop being harvested. That is the operator pre-selects or pre-determines a particular predetermined cut height set point of the header for his or her desired mode of operation relative to a particular crop being harvested. The predetermined cut height set point is the desired height of the header from the ground surface optimal for harvesting the particular crop. For example, a predetermined cut height set point for a windrower header for harvesting canola can vary from about 12 to 18 inches and between about 8 and 12 inches for a combine header harvesting corn.

When the agricultural harvester is placed into operation, the ground sensors at a plurality of positions along the header measure the height of the header from the ground along the width-wise direction of the header (step 152). Additionally, a ground speed of the agricultural harvester is measured e.g., via the ground speed sensor (step 154). The height of the header and ground speed of the agricultural harvester are then communicated to the computer. Based upon these values, the computer determines the amount of adjustment allowed for the height of the header i.e., the computer determines which adjusted cut height set point or threshold, it can move the header towards (step 156). For example, the determined adjusted cut height threshold can be determined, as further discussed below, to be a first, second, or third adjusted cut height threshold.

The amount of allowable deviation from the predetermined cut height set point is dependent on ground speed of the agricultural harvester. Based on the allowable deviation, the computer contains instructions to reposition e.g., lower, the header towards a first adjusted cut height threshold, a second adjusted cut height threshold, or a third adjusted cut height threshold. The first adjusted cut height threshold is a height less than that of the predetermined cut height set point. The second adjusted cut height threshold is a height less than that of the predetermined cut height set point, but greater than the first adjusted cut height threshold. The third adjusted cut height threshold is a height less than that of the predetermined cut height set point, but greater than the second adjusted cut height threshold.

In an aspect of the subject application, the first adjusted cut height threshold can be about 10% of the predetermined cut height set point, the second adjusted cut height threshold can be between about 10% and 20% of the predetermined cut height set point, and the third adjusted cut height threshold can be greater than 20% of the predetermined cut height set point. For example, if the predetermined cut height set point is 10 inches, the first adjusted cut height threshold would be about 1 inch, the second adjusted cut height threshold would be between about 1 and 2 inches, and the third adjusted cut height threshold would be greater than about 2 inches. Accordingly, the predetermined cut height set point ranges and/or values can be increased or decreased relative to the type of crop being harvested.

In an aspect of the subject application, the adjusted cut height thresholds can be predetermined relative to a total cut height range of a specific crop being harvested. For example, the first adjusted cut height threshold can be about 10% of the total cut height range, the second adjusted cut height threshold can be between about 10% and 20% of the total cut height range, and the third adjusted cut height threshold can be greater than 20% of the total cut height range. For example, if the total cut height range is 24 inches, the first adjusted cut height threshold would be about 2.4 inches, the second adjusted cut height threshold would be between about 2.4 and 4.8 inches, and the third adjusted cut height threshold would be greater than about 4.8 inches. Accordingly, the total cut height ranges and/or values can be increased or decreased relative to the type of crop being harvested.

Alternatively, the first, second and third adjusted cut height thresholds can be predetermined relative to a specific operator's preference for the type of crop being harvested. For example, the first adjusted cut height threshold can be about 2-8 inches, the second adjusted cut height threshold can be about 4-16 inches and the third adjusted cut height threshold can be greater than about 16 inches for a header when harvesting canola.

In operation, if a measured distance of one of the plurality of ground sensors is above the predetermined cut height set point, the computer is configured to cause the header to adjust a position of the header from a predetermined cut height set point towards an adjusted cut height threshold based upon the measured ground speed of the harvester. However, whether the header is repositioned towards the first adjusted cut height threshold, the second adjusted cut height threshold, or the third adjusted cut height threshold will depend upon the measured ground speed of travel of the agricultural harvester.

For purposes of illustration, the following is an example illustrating operation of the subject application. In this example, the predetermined cut height set point is 10 inches, the first adjusted cut height threshold is 5 inches, the measured ground speed is a low or slow speed and a first ground sensor measures a distance from the ground of 13 inches while the other three sensors measure 10 inches. Upon the computer receiving the first ground sensor measurement, the header is lowered towards the 5 inches first adjusted cut height threshold since the first ground sensor measures above 10 inches. Upon lowering the header 3 inches, the first ground sensor will measure 10 inches and will no longer be above the predetermined cut height set point of 10 inches. Thus, the header will stop its lowering movement towards the 5 inches first adjusted cut height threshold and will temporarily maintain its position of the first ground sensor measuring 10 inches and the other three sensors between 5 inches and 10 inches. Afterwards, the header will attempt to reposition the header back to the predetermined cut height set point of 10 inches. However, upon movement of the header back to the predetermined cut height set point, if one of the plurality of ground sensors measures above the predetermined cut height set point, the header will again lower towards the 5 inches first adjusted cut height threshold.

The operational ground speed of an agricultural harvester can vary depending on the type of agricultural harvester. Typically, a maximum operational speed of a combine harvester is about 6 miles per hour. On the other hand, a maximum operational speed of a windrower can range from about 5 to 10 miles per hour. As discussed above, the ground speed of travel of the agricultural harvester will determine whether the header is lowered towards the first adjusted cut height threshold, the second adjusted cut height threshold, or the third adjusted cut height threshold. Predetermined ground speed ranges are determined by the operator for his or her desired mode of operation relative to a particular crop being harvested or may be set to default settings stored within the combine computer or a modified version of the default settings. For example, if the agricultural harvester travels within a slow speed range, the ground speed would be between about 0.5 miles per hour and a first predetermined ground speed. If the agricultural harvester travels at an intermediate speed range, the ground speed would be greater than the first predetermined ground speed, but less than a second predetermined ground speed. If the agricultural harvester travels at a fast ground speed range, the ground speed would be greater than the second predetermined ground speed.

In an aspect of the subject application, the first predetermined ground speed of the agricultural harvester is about 3 miles per hour and the second predetermined ground speed is about 6 miles per hour. As such, an agricultural harvester traveling at the slow speed range would be traveling between 0.5 and about 3 miles per hour. An agricultural harvester traveling at the intermediate speed range would be traveling between about 3 miles per hour and about 6 miles per hour. Finally, an agricultural harvester traveling at the fast speed range would be traveling above 6 miles per hour. The speed ranges can be set as default values or adjusted accordingly based on operator preference, the type of crop being harvested, the type of agricultural harvester and the specific contour of the field being harvested.

Thus, in operation, if the ground speed of travel of the agricultural harvester measures below the first predetermined ground speed, the computer is configured to lower the header towards the first adjusted cut height threshold if one of the plurality of ground sensors measures above the predetermined cut height set point. If the ground speed of travel of the agricultural harvester measures above the first predetermined ground speed, but below the second predetermined ground speed, the computer is configured to lower the header towards the second adjusted cut height threshold if one of the plurality of ground sensors measures above the predetermined cut height set point. If the ground speed of travel of the agricultural harvester measures above the second predetermined ground speed, the computer is configured to lower the header towards the third adjusted cut height threshold if one of the plurality of ground sensors measures above the predetermined cut height set point. In other words, the computer is configured to lower the header towards the adjusted cut height thresholds until the remaining ground sensors meet the predetermined cut height set point or the adjusted cut height threshold is reached. That is, the header does not need to move all the way to the adjusted cut height threshold. Rather, the header only needs to be moved enough to bring the ground sensors to the predetermined cut height set point if the adjusted cut height threshold has not yet been reached.

The computer 30 is operatively connected to and in communication with the header 12 e.g., the header hydraulics for raising and lowering the header. Upon determining whether to lower the header towards a first, second or third adjusted cut height threshold, the computer positions the header towards the determined adjusted cut height threshold (step 158).

Figure 4:
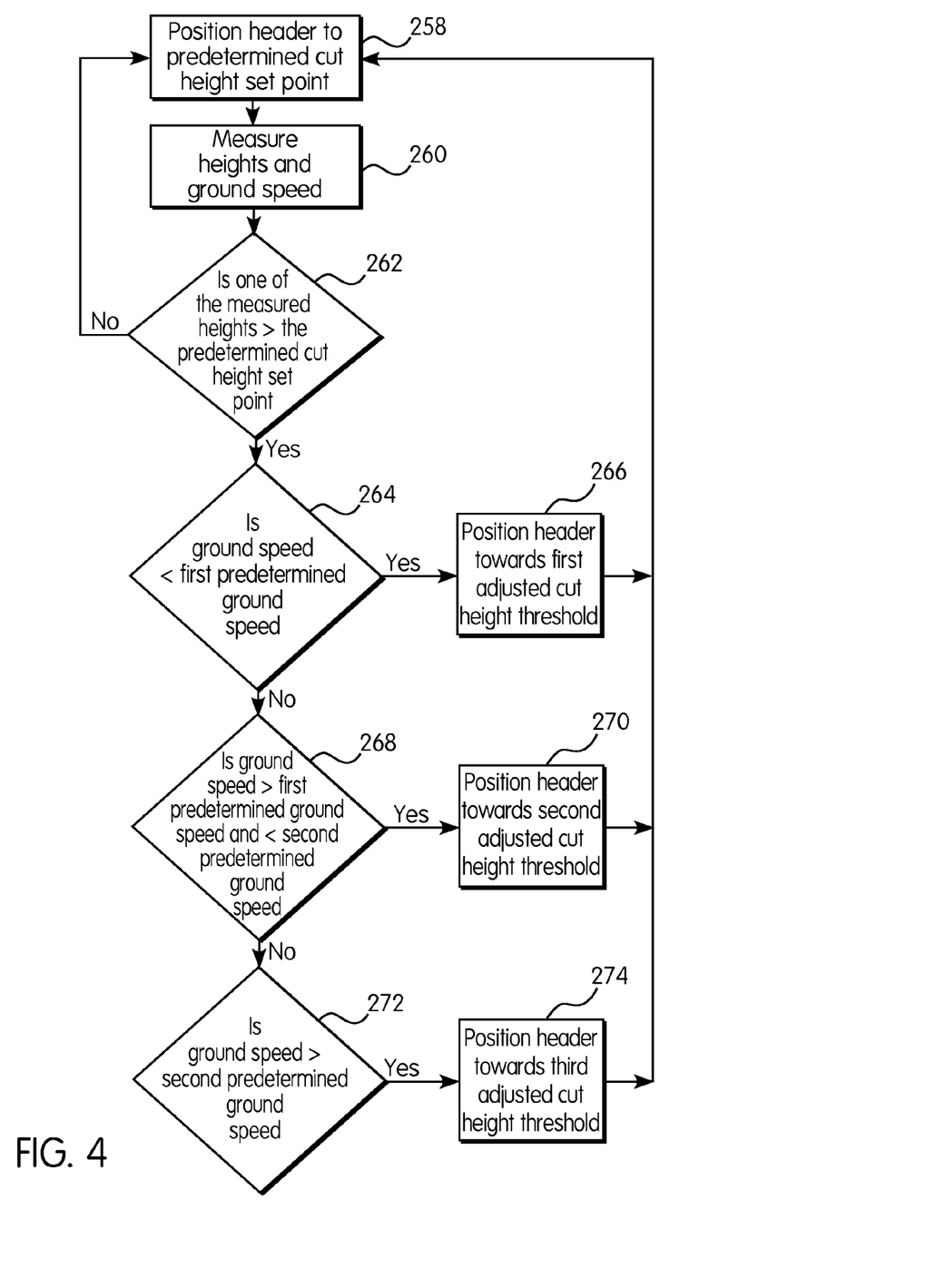
FIG. 4 is a flow diagram illustrating a method of automatically controlling a cut height of a header in accordance with the subject application.

As illustrated in FIG. 4, the process of determining the adjusted cut height threshold can be determined through a series of steps executed by the computer via instructions comprising software for the computer. The exemplary flow diagram of FIG. 4 illustrates the method of automatically controlling a cut height of a header in accordance with an aspect of the subject application. Initially, the header is set to a predetermined cut height set point (step 258). As described in detail above, the computer receives the height measurements of the ground sensors and ground speed of the agricultural harvester (step 260). If one of the measured heights of the ground sensors is greater than the predetermined cut height set point (step 262), the computer determines whether the header is lowered towards a first, second or third adjusted cut height threshold.

If the measured ground speed is less than the first predetermined ground speed (step 264), the header is lowered towards the first adjusted cut height threshold (step 266). If the measured ground speed is greater than the first predetermined ground speed and less than the second predetermined ground speed (step 268), the header is lowered towards the second adjusted cut height threshold (step 270). If the measured ground speed is greater than the second predetermined ground speed (step 272), the header is lowered towards the third adjusted cut height threshold (step 274). When lowering the header towards the respective adjusted cut height thresholds (steps 266, 270 and 274), the header will lower until height measurements of the ground sensors no longer measure above the predetermined cut height set point or until the respective adjusted cut height threshold is reached. Subsequently, the header will stop its lowering movement towards the respective adjusted cut height thresholds and will temporarily maintain its position. Thereafter, step 258 is repeated i.e., the header will attempt to reposition the header back to the predetermined cut height set point. However, upon initiation of repositioning or movement of the header back to the predetermined cut height set point, if one of the plurality of ground sensors measures above the predetermined cut height set point, the header will again lower towards the respective adjusted cut height threshold or remain at its current position.

For example, in accordance with an aspect of the subject application, if the measured ground speed is less than about 3 miles per hour, the header is lowered towards the first adjusted cut height threshold e.g., about 10% of the predetermined cut height set point if one of the ground sensors measures above the predetermined cut height set point. If the measured ground speed is between 3 and 6 miles per hour, the header is lowered towards the second adjusted cut height threshold e.g., between 10% and 20% of the predetermined cut height set point if one of the ground sensors measures above the predetermined cut height set point. If the measured ground speed is greater than 6 miles per hour, the header is lowered towards the third adjusted cut height threshold e.g., greater than 20% of the predetermined cut height set point if one of the ground sensors measures above the predetermined cut height set point. Because there is a delay in adjusting header height, as the agricultural harvester travels faster, the adjusted cut height threshold or range increases to protect the header from damage resulting from an uneven contour or any objects in the path of the agricultural harvester.

Referring back to FIG. 4, the exemplary flow diagram loop will continue to be repeated until harvesting operations have been completed or manual intervention of an operator. As such, the header of the subject application will continue to readjust the height of the header relative to the ground as the agricultural harvester travels across varying contours. As discussed above in regard to FIGS. 2-4, a predetermined cut height set point is inputted by the operator relative to the type of crop being harvested. Conventional agricultural harvesters automatically attempt to rigidly maintain the ground sensors at the predetermined cut height set point and do not allow the header to go below the predetermined cut height set point. However, the subject application advantageously allows the header to drop below the predetermined cut height set point in order to gather as much crop as possible.

In an aspect of the subject application where the ground sensors are configured as potentiometers, the first adjusted cut height threshold is a height within about 10% of the operating range of the potentiometer with the lowest measured distance. The second adjusted cut height threshold is a height within 10-20% of the operating range of the potentiometer with the lowest measured distance. The third adjusted cut height threshold is a height within about 20% of the operating range of the potentiometer with the lowest measured distance.

For example, if the potentiometer is configured to have a voltage range from 0-5V, a true operating value of the sensor would be between 0.1V and 4.8V. As discussed above, the potentiometers produce a voltage representative of the distance between the header and the ground. As such, 0.1V would represent the header on the ground and 4.8V would represent the maximum height of the header from the ground. The range of the potentiometer would be 4.7V.

Thus, if the operating range of a potentiometer is 4.7V, then the first adjusted cut height threshold would be represented by a voltage reading of 0.47V i.e., 10% of the operating range of the potentiometer. The second adjusted cut height threshold would be represented by a voltage reading between 0.47V and 0.94V i.e., 10-20% of the operating range of the potentiometer if the operating range is 4.7V. The third adjusted cut height threshold would be represented by a voltage reading of 0.94V i.e., 20% of the operating range of the potentiometer if the operating range is 4.7V. Each voltage reading would correspond to a distance between the header and the ground surface. The distances would vary depending on the predetermined cut height set point and a cutting range of the particular crop.

In yet another aspect of the subject application where the ground sensors are configured as potentiometers, the first adjusted cut height threshold is a height within about 10% of an average of the operating ranges of any two potentiometers with the lowest measured distances. The second adjusted cut height threshold is a height within 10-20% of an average of the operating ranges of any two potentiometers with the lowest measured distances. The third adjusted cut height threshold is a height within about 20% of an average of the operating ranges of any two potentiometers with the lowest measured distances.

Figure 5A:
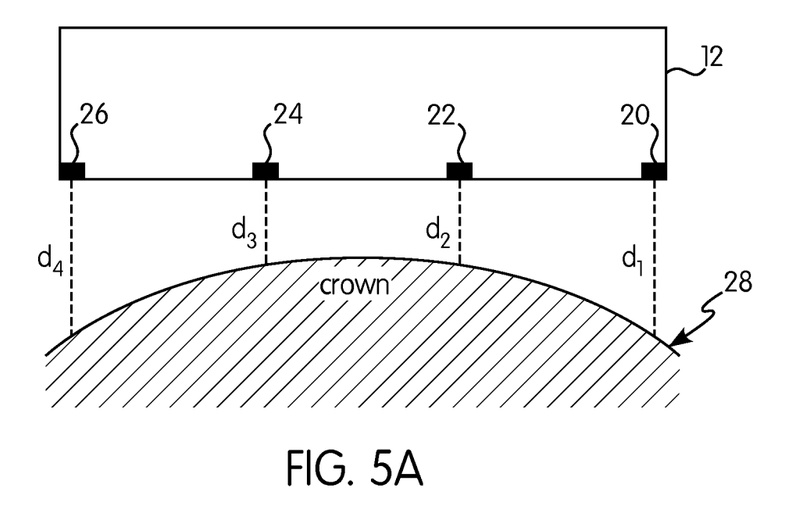
FIG. 5A is a simplified front view of an agricultural harvester in accordance with the subject application positioned on a crown of a field.
Figure 5B:
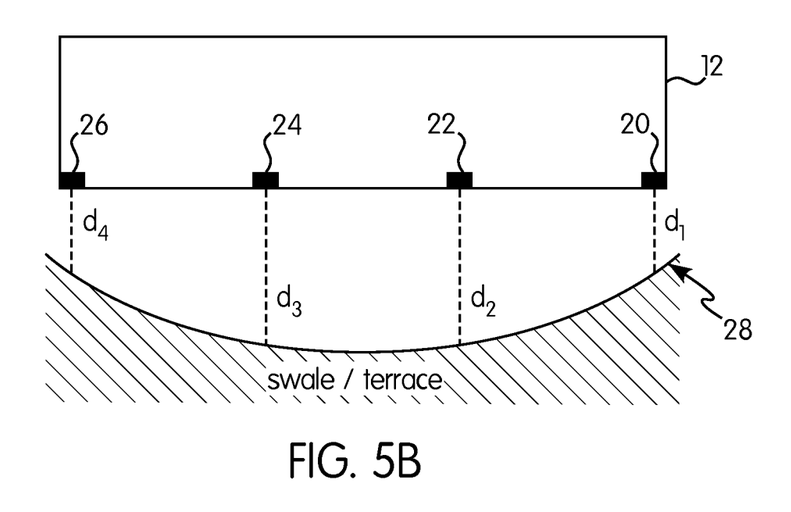
FIG. 5B is a simplified front view of an agricultural harvester in accordance with the subject application positioned on a terrace of a field.

Referring now to FIGS. 5A and 5B, there are shown two exemplary aspects of the subject application where the header of the agricultural harvester is in operation. Heights $d_1$, $d_2$, $d_3$, $d_4$ represent the distances between each respective ground sensor and the ground surface 28. Specifically, FIG. 5A refers to header 12 of an agricultural harvester traveling over a crown in a field and FIG. 5B refers to header 12 of an agricultural harvester traveling over a terrace/swale in the field. With regard to both aspects, if the agricultural harvester was traveling at a slow speed and one of the ground sensors measures a height above the predetermined cut height set point, the header would lower towards the first adjusted cut height threshold. If the agricultural harvester was traveling at an intermediate speed and one of the ground sensors measures a height above the predetermined cut height set point, the header would lower towards the second adjusted cut height threshold. If the agricultural harvester was traveling at a fast speed and one of the ground sensors measures a height above the predetermined cut height set point, the header would lower towards the third adjusted cut height threshold. In the case of a crown in the field when operating at a slow speed (as shown in FIG. 5A), the header would lower towards the first adjusted cut height threshold if one of the outer ground sensors measures a height above the predetermined cut height set point. In the case of a terrace/swale in the field when operating at a slow speed (as shown in FIG. 5B), the header would lower towards the first adjusted cut height threshold if one of the middle ground sensors measures a height above the predetermined cut height set point.

For purposes of illustration, the following is an example illustrating operation of the subject application in the case of a crown in the field when operating at a slow speed (as shown in FIG. 5A). The predetermined cut height set point is 12 inches, the first adjusted cut height threshold is 4 inches, the measured ground speed is a low or slow speed, middle ground sensors 22, 24 respectively measure distances $d_2$, $d_3$ from the ground as 10 inches and outer ground sensors 20, 26 respectively measure distances $d_1$, $d_4$ from the ground as 15 inches. Upon the computer receiving the ground sensor measurements, the header is lowered towards the first adjusted cut height threshold (i.e., the 4 inches mark) since outer ground sensors 20, 26 measure above 12 inches. Upon lowering the header 3 inches, outer ground sensors 20, 26 will measure 12 inches and will no longer be above the predetermined cut height set point of 12 inches. Additionally, middle ground sensors 22, 24 will measure 7 inches. Thus, the header will stop its lowering movement towards the 4 inches first adjusted cut height threshold and will temporarily maintain its position of outer ground sensors 20, 26 measuring 12 inches and middle ground sensors 22, 24 measuring 7 inches. Afterwards, the header will attempt to reposition the header back to the predetermined cut height set point of 12 inches. However, upon initiation of a repositioning or movement of the header back to the predetermined cut height set point, if one of the plurality of ground sensors measures above the predetermined cut height set point, the header will again lower towards the 4 inches first adjusted cut height threshold or remain at its current position.

For purposes of illustration, the following is an example illustrating operation of the subject application in the case of a terrace/swale in the field when operating at a slow speed (as shown in FIG. 5B). In this example, the predetermined cut height set point is 12 inches, the first adjusted cut height threshold is 4 inches, the measured ground speed is a low or slow speed, middle ground sensors 22, 24 respectively measure distances $d_2$, $d_3$ from the ground as 24 inches and outer ground sensors 20, 26 respectively measure distances $d_1$, $d_4$ from the ground as 12 inches. Upon the computer receiving the ground sensor measurements, the header is lowered towards the 4 inches first adjusted cut height threshold since middle ground sensors 22, 24 measure above 12 inches. Upon lowering the header 8 inches, middle ground sensors 22, 24 will measure 16 inches i.e., above the predetermined cut height set point of 12 inches. Additionally, outer ground sensors 20, 26 will measure 4 inches i.e., the first adjusted cut height threshold. Thus, the header will stop its lowering movement at the 4 inches first adjusted cut height threshold and will temporarily maintain its position of outer ground sensors 20, 26 measuring 4 inches and middle ground sensors 22, 24 measuring 16 inches. Afterwards, the header will attempt to reposition the header back to the predetermined cut height set point of 12 inches. However, upon initiation of a repositioning or movement of the header back to the predetermined cut height set point, if one of the plurality of ground sensors measures above the predetermined cut height set point, the header will again lower towards the 4 inches first adjusted cut height threshold or remain at its current position.

While the subject application has been described with reference to several aspects, it will be appreciated by those skilled in the art that various changes may be made and equivalents may be substituted for elements thereof without departing from the scope of the subject application. In addition, many modifications may be made to adapt a particular situation or material to the teachings of the subject application without departing from the essential scope thereof. It is to be understood, therefore, that the subject application not be limited to the particular aspects disclosed, but it is intended to cover modifications within the spirit and scope of the subject application as defined by the appended claims.

What is claimed is:

1. A method for automatically controlling a cut height of a header of an agricultural harvester with a control system comprising a programmed controller, the method comprising the steps of:
    positioning with a control system the header to a predetermined cut height set point;
    measuring a ground speed of the agricultural harvester with a sensor connected to the control system;
    measuring a height of the header relative to a ground surface with sensors located a plurality of positions along a length of the header; and
    repositioning the header with the control system towards a first adjusted cut height threshold based on a measured height of at least one of the plurality of positions and a measured around speed, wherein the control system is configured if the measured height of one of the plurality of positions is above the predetermined cut height set point and the measured ground speed is less than a first predetermined ground speed to move the header toward the first adjusted cut height threshold.

2. The method of claim 1, further comprising repositioning the header with the control system towards a second adjusted cut height threshold if a measured height of one of the plurality of positions is above the predetermined cut height set point and the measured ground speed is greater than the first predetermined ground speed and less than a second predetermined ground speed.

3. The method of claim 2, further comprising repositioning the header with the control system towards a third adjusted cut height threshold if a measured height of one of the plurality of positions is above the predetermined cut height set point and the measured ground speed is greater than a second predetermined ground speed.

4. The method of claim 2, wherein the first predetermined ground speed is about 3 miles per hour and the second predetermined ground speed is about 6 miles per hour, wherein the first adjusted cut height threshold is about 10% of the predetermined cut height set point, and wherein the second adjusted cut height threshold is between 10% and 20% of the predetermined cut height set point.

5. The method of claim 3, wherein the third adjusted cut height threshold is greater than 20% of the predetermined cut height set point.

6. The method of claim 2, wherein the first adjusted cut height threshold is about 2-8 inches, and wherein the second adjusted cut height threshold is about 4-16 inches.

7. The method of claim 3, wherein the first adjusted cut height threshold is about 10% of the predetermined cut height set point when the measured ground speed is less than about 3 miles per hour, and wherein the third adjusted cut height threshold is greater than 20% of the predetermined cut height set point when the measured ground speed is greater than 6 miles per hour.

8. The method of claim 3, wherein the height is measured using a potentiometer and the first adjusted cut height threshold is within about 10% of an operating range of one of the potentiometers and the third adjusted cut height threshold is within about 20% of an operating range of one of the potentiometers.

9. An agricultural harvester comprising:
    a header that includes:
        a plurality of ground sensors spaced along a width of the header, wherein each of the plurality of ground sensors is configured to measure a distance from the header to a ground surface; and
        a computer operatively connected to the header and the plurality of ground sensors,
    wherein the computer is configured to cause the header to adjust a position of the header from a predetermined cut height set point towards a first adjusted cut height threshold based on a measured ground seed of travel and a measured distance of at least one of the plurality of around sensors, wherein if the measured distance of one of the plurality of ground sensors is above the predetermined cut height set point and the measured ground speed of travel of the agricultural harvester is less than a first predetermined ground speed the computer is configured to adjust the position of the header towards the first adjusted cut height threshold.

10. An agricultural harvester comprising:
    a header that includes:
        a plurality of around sensors spaced along a width of the header, wherein each of the plurality of around sensors is configured to measure a distance from the header to a around surface; and
        a computer operatively connected to the header and the plurality of ground sensors,
    wherein the computer is configured to cause the header to adjust a position of the header from a predetermined cut height set point towards a first adjusted cut height threshold if a measured distance of one of the plurality of around sensors is above the predetermined cut height set point and a measured around speed of travel of the agricultural harvester is less than a first predetermined ground speed;
    wherein the computer includes a non-transitory computer readable medium having stored thereon computer instructions that, when executed by a processor, cause the computer to adjust the position of the header towards a second adjusted cut height threshold if a measured distance of one of the plurality of ground sensors is above the predetermined cut height set point and the measured ground speed of travel is greater than the first predetermined ground speed and less than a second predetermined ground speed.

11. The agricultural harvester of claim 10, wherein the non-transitory computer readable medium further includes computer instructions that, when executed by a processor, cause the header to adjust the position of the header towards a third adjusted cut height threshold if a measured distance of one of the plurality of ground sensors is above the predetermined cut height set point and the measured ground speed of travel is greater than the second predetermined ground speed.

12. The agricultural harvester of claim 10, wherein the first predetermined ground speed is about 3 miles per hour and the second predetermined ground speed is about 6 miles per hour.

13. The agricultural harvester of claim 11, wherein the first adjusted cut height threshold is about 10% of the predetermined cut height set point, the second adjusted cut height threshold is between 10% and 20% of the predetermined cut height set point, and the third adjusted cut height threshold is greater than 20% of the predetermined cut height set point.

14. The agricultural harvester of claim 11, wherein the first adjusted cut height threshold is about 2-8 inches, the second adjusted cut height threshold is about 4-16 inches, and the third adjusted cut height threshold is greater than 16 Inches.

15. The agricultural harvester of claim 11, wherein the plurality of ground sensors are potentiometers and the first adjusted cut height threshold is within about 10% of an operating range of one of the plurality of sensors, the second adjusted cut height threshold is within 10%-20% of an operating range of one of the plurality of sensors, and the third adjusted cut height threshold is within about 20% of an operating range of one of the plurality of sensors.

16. The agricultural harvester of claim 11, wherein the plurality of ground sensors are potentiometers and the first adjusted cut height threshold is within about 10% of an operating range of any two sensors of the plurality of sensors, the second adjusted cut height threshold is within 10%-20% of an operating range of any two sensors of the plurality of sensors, and the third adjusted cut height threshold is within about 20% of an operating range of any two sensors of the plurality of sensors.

17. The agricultural harvester of claim 15, wherein the first predetermined ground speed is about 3 miles per hour and the second predetermined ground speed is about 6 miles per hour.

18. A method for automatically controlling a cut height of a header of an agricultural vehicle comprising:
   positioning the header to a predetermined cut height set point;
   measuring a height of the header relative to a ground surface at a plurality of positions along a length of the header with a sensor connected to a control system; and
   repositioning with the control system the header toward a determined adjusted cut height threshold below the predetermined cut height set point if a measured height of one of the plurality of positions is above the predetermined cut height set point wherein the determined adjusted cut height threshold is determined based on a measured speed of the vehicle.

19. The method of claim 18, wherein the determined cut height threshold is selected from at least a first adjusted cut height threshold, a second adjusted cut height threshold and a third adjusted cut height threshold:
   wherein the step of repositioning the header below the predetermined cut height set point includes:
   repositioning the header towards the first adjusted cut height threshold if a measured ground speed is less than about 3 miles per hour,
   repositioning the header towards the second adjusted cut height threshold if a measured ground speed is 3 miles per hour or greater and less than 6 miles per hour, and
   repositioning the header towards the third adjusted cut height threshold if a measured ground speed is about 6 miles per hour or greater.

20. The method of claim 19, wherein the first adjusted cut height threshold is about 10% of the predetermined cut height set point, the second adjusted cut height threshold is between 10% and 20% of the predetermined cut height set point, and the third adjusted cut height threshold is greater than 20% of the predetermined cut height set point.

21. The method of claim 19, wherein the first adjusted cut height threshold is about 2-8 inches, the second adjusted cut height threshold is about 4-16 inches, and the third adjusted cut height threshold is greater than 16 inches.

* * * * *